US012063467B2

(12) United States Patent
Yang et al.

(10) Patent No.: US 12,063,467 B2
(45) Date of Patent: Aug. 13, 2024

(54) SOUND PRODUCING DEVICES

(71) Applicant: SHENZHEN SHOKZ CO., LTD., Guangdong (CN)

(72) Inventors: Song Yang, Shenzhen (CN); Fen You, Shenzhen (CN); Yonggen Wang, Shenzhen (CN); Zhiqing Liu, Shenzhen (CN); Xinnan Mao, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 162 days.

(21) Appl. No.: 17/934,190

(22) Filed: Sep. 21, 2022

(65) Prior Publication Data

US 2023/0012492 A1 Jan. 19, 2023

Related U.S. Application Data

(63) Continuation of application No. PCT/CN2021/088370, filed on Apr. 20, 2021.

(30) Foreign Application Priority Data

Jul. 28, 2020 (CN) ......................... 202010737326.8
Jul. 28, 2020 (CN) ......................... 202021542898.2
Aug. 13, 2020 (CN) ......................... 202021729656.4

(51) Int. Cl.
*H04R 1/10* (2006.01)

(52) U.S. Cl.
CPC ......... *H04R 1/1025* (2013.01); *H04R 1/1058* (2013.01); *H04R 1/1091* (2013.01); *H04R 2420/07* (2013.01); *H04R 2420/09* (2013.01)

(58) Field of Classification Search
CPC ................ H01R 13/443; H01R 13/447; H01R 13/5213; H04R 1/10; H04R 1/1008; H04R 1/1016; H04R 2225/77
See application file for complete search history.

(56) References Cited

U.S. PATENT DOCUMENTS 8,199,464 B2 * 6/2012 Zuo .................... H01R 13/5213 361/679.01
8,395,887 B2 * 3/2013 Zhang .................. H01R 13/443 361/679.01
(Continued)

FOREIGN PATENT DOCUMENTS

CN 105098461 A * 11/2015
CN 107155277 A 9/2017
(Continued)

OTHER PUBLICATIONS

International Search Report in PCT/CN2021/088370 mailed on Jun. 10, 2021, 7 pages.

*Primary Examiner* — Ryan Robinson
(74) *Attorney, Agent, or Firm* — METIS IP LLC

(57) ABSTRACT

The present disclosure provides a sound producing device, at least comprising a housing assembly. The housing assembly comprises a housing and a sealing member. The housing is provided with a plug-in hole, and the plug-in hole runs through a side wall of one side of the housing; the sealing member is used for plugging and sealing the plug-in hole; the plug-in hole comprises at least one hole wall segment provided along a plugging direction of the sealing member; the cross-sectional area of a reference cross section of at least part of the at least one hole wall segment perpendicular to the plugging direction of the sealing member increases gradually along the plugging direction; the sealing member is in plugging fit with the at least one hole wall segment.

20 Claims, 13 Drawing Sheets

III-III

(56) References Cited

U.S. PATENT DOCUMENTS

| | | | | |
|---|---|---|---|---|
| 9,608,356 | B2 * | 3/2017 | Kann | H04R 1/083 |
| 2010/0033913 | A1 * | 2/2010 | Cao | H01R 13/6596<br>439/135 |
| 2020/0011491 | A1 | 1/2020 | Cao et al. | |

FOREIGN PATENT DOCUMENTS

| | | | |
|---|---|---|---|
| CN | 112073885 | A | 12/2020 |
| CN | 212628411 | U | 2/2021 |
| CN | 212910010 | U | 4/2021 |

* cited by examiner

100

| | | | | | | | | | | | |
|---|---|---|---|---|---|---|---|---|---|---|---|
| GND | TX1+ | TX1- | VBUS | CC1 | D+ | D- | SBU1 | VBUS | RX2- | RX2+ | GND |
| GND | RX1+ | RX1- | VBUS | SBU2 | D- | D+ | CC2 | VBUS | TX2- | TX2+ | GND |

FIG. 12

SOUND PRODUCING DEVICES

CROSS-REFERENCE TO RELATED APPLICATIONS

This application is a continuation of International Application No. PCT/CN2021/088370, filed on Apr. 20, 2021, which claims priority to Chinese Patent Application No. 202010737326.8, filed on Jul. 28, 2020, Chinese Patent Application No. 202021542898.2, filed on Jul. 28, 2020, and Chinese Patent Application No. 202021729656.4, filed on Aug. 13, 2020, the entire contents of each of which are hereby incorporated by reference.

TECHNICAL FIELD

The present disclosure relates the field of acoustic output technology, and in particular, to sound producing devices.

BACKGROUND

Sound producing devices have been widely used in people's daily life. The sound producing devices may be used in conjunction with electronic devices such as mobile phones, tablet computers, laptop computers, etc., to facilitate providing audio information for users. Various plug-in holes (e.g., a USB plug-in hole, a TYPE-C interface, etc.) may be provided on the sound producing device to achieve corresponding functions. For example, a plug-in hole may correspond to a USB plug-in hole, so that the sound producing device may achieve a function such as charging and a corresponding cable through the USB plug-in hole. As another example, the plug-in hole may correspond to an audio interface, so that the sound producing device may be connected to an electronic device and a corresponding cable to achieve a function such as data transmission through the audio interface. Obviously, the sound producing device may be connected to an external environment at the plug-in hole, and waterproof and dustproof performance thereof may be affected.

To solve the above problems, the present disclosure provides sound producing devices with better waterproof and dustproof performance.

SUMMARY

Some embodiments of the present disclosure provide a sound producing device including at least one housing assembly. The housing assembly may include a housing, wherein the housing is provided with a plug-in hole, and the plug-in hole penetrates through a side wall of a side of the housing; and a sealing member configured to plug and seal the plug-in hole. The plug-in hole may include at least one hole wall segment disposed along a plugging direction of the sealing member. A cross-sectional area of at least part structure of the at least one hole wall segment on a reference section may gradually increase along the plugging direction of the sealing member. The reference section may be perpendicular to the plugging direction. The sealing member may be plugging fit with the at least one hole wall segment.

In some embodiments, the sealing member may include an insertion part configured to insert into the plug-in hole. The insertion part may include at least one protruding structure, and the at least one protruding structure may abut against the at least one hole wall segment when the insertion part is inserted into the plug-in hole.

In some embodiments, the at least one hole wall segment may include a first hole wall segment and a second hole wall segment. The first hole wall segment and the second hole wall segment may be connected in sequence along the plugging direction of the sealing member. An included angle between the second hole wall segment and the first hole wall segment may be an obtuse angle on a reference plane parallel to the plugging direction.

In some embodiments, the included angle between the second hole wall segment and the first hole wall segment on the reference plane may be θ, and $155° \leq \theta < 180°$.

In some embodiments, a cross-sectional area of the second hole wall segment on the reference section may gradually increase along the plugging direction.

In some embodiments, the housing may further include a mounting hole. The sealing member may include an assembly part connected to the insertion part. The assembly part may be fixedly connected to the housing through the mounting hole.

In some embodiments, a free end of the insertion part may be provided with an avoidance structure. The avoidance structure may be configured to reduce interference between a corner of the free end of the insertion part away from the assembly part and the housing during a process of inserting the insertion part into the plug-in hole or taking out the insertion part from the plug-in hole.

In some embodiments, the avoidance structure may include a corner cut. The corner cut may be disposed at the corner of the free end of the insertion part away from the assembly part.

In some embodiments, the avoidance structure may include at least one groove. The groove may divide the free end of the insertion part into at least two parts in a circumferential direction.

In some embodiments, the sealing member may further include a connecting part configured to connect the insertion part and the assembly part. The connecting part may include a thinning structure located between the insertion part and the assembly part. The thinning structure may cause the insertion part to be bent relative to the assembly part under an action of an external force.

In some embodiments, the housing may include a slot. The plug-in hole and the mounting hole may be connected with a bottom of the slot. The connecting part may be blocked by the bottom of the slot in the process of inserting the insertion part into the plug-in hole.

In some embodiments, the housing may include an accommodating cavity. The plug-in hole and the mounting hole may be respectively connected with the accommodating cavity. The housing assembly may further include an interface disposed in the accommodating cavity. The interface may be disposed correspondingly to the plug-in hole, and the interface may be exposed through the plug-in hole after the insertion part is taken out of the plug-in hole.

In some embodiments, the housing assembly may further include an indicator light disposed in the accommodating cavity. The assembly part may be a light-transmitting member, and the assembly part may be disposed corresponding to the indicator light, so as to guide light emitted by the indicator light to outside of the housing.

In some embodiments, the sound producing device may further include a charging assembly. The charging assembly may be fixed in the accommodating cavity of the housing. The charging assembly may include an interface including at least one charging pin and at least one burning pin; a processing chip connected to the at least one burning pin, wherein the processing chip burns data through the at least one burning pin to adjust parameters of the sound producing device; and a battery management module and a battery. The battery management module may be configured to control a charging current of the battery, and the battery may be configured to power the sound producing device. The battery management module may be connected to the at least one charging pin.

In some embodiments, the interface may include at least one of a TYPE-A interface, a TYPE-B interface, a TYPE-C interface, a USB interface, or a Lighting interface.

In some embodiments, the interface may be the TYPE-C interface. A TX+ pin, a TX-pin, a RX+ pin and a RX-pin of the TYPE-C interface may be the at least one burning pin used to burn the data.

In some embodiments, the processing chip may include a first processing chip and a second processing chip. An I2C interface of the first processing chip may be connected to the TX+ pin and the TX-pin. An I2C interface of the second processing chip may be connected to the RX+ pin and the RX-pin, so that the first processing chip and the second processing ship may burn data simultaneously.

In some embodiments, the battery may be a fast-charged lithium battery, and the battery management module may control the charging current according to a voltage of the battery.

In some embodiments, the battery management module may control the charging current according to the voltage of the battery by: obtaining the voltage of the battery; determining whether the voltage of the battery is within a first preset voltage range; and in response to determining that the voltage of the battery is within the first preset voltage range, controlling the charging current to be within a first preset current range.

In some embodiments, the battery management module may control the charging current according to the voltage of the battery by: obtaining the voltage of the battery; determining whether the voltage of the battery is within a second preset voltage range; and in response to determining that the voltage of the battery is within the second preset voltage range, reducing the charging current to keep the voltage of the battery being within the second preset voltage range.

In some embodiments, the battery management module may control the charging current according to the voltage of the battery by: obtaining the charging current; determining whether the charging current is within a the second preset current range; and in response to determining that the charging current is within the second preset current range, controlling the battery to stop charging.

In some embodiments, the charging assembly may further include a voltage regulator configured to convert an output voltage of the battery into a regulated voltage. An input end of the voltage regulator may be connected to an output end of the battery, and an output end of the voltage regulator may be connected to an input end of the processing chip.

In some embodiments, the sound producing device may further include: a power amplifier chip, wherein an input end of the power amplifier chip is connected to an output end of the processing chip, and the power amplifier chip is configured to amplify an audio signal of the processing chip; and at least one speaker connected to an output end of the power amplifier chip and configured to output the audio signal of the processing chip amplified and processed by the power amplifier chip.

In some embodiments, the sound producing device may further include at least one microphone connected to an input end of the processing chip and configured to output a received audio signal to the processing chip.

In some embodiments, the interface may include an identification pin configured to identify a functional accessory so that the sound producing device may be matched and connected to the functional accessory.

In some embodiments, the charging assembly may further include a pull-down resistor. One end of the pull-down resistor may be connected to the identification pin, and the other end of the pull-down resistor may be grounded.

In some embodiments, the charging assembly may include a plurality of TVS Diodes. One end of the TVS Diode may be connected to the burning pin or the charging pin, and the other end of the TVS Diode may be grounded.

BRIEF DESCRIPTION OF THE DRAWINGS

FIG. 12 is a wiring definition diagram illustrating an interface according to some embodiments of the present disclosure.

DETAILED DESCRIPTION

Figure 1:
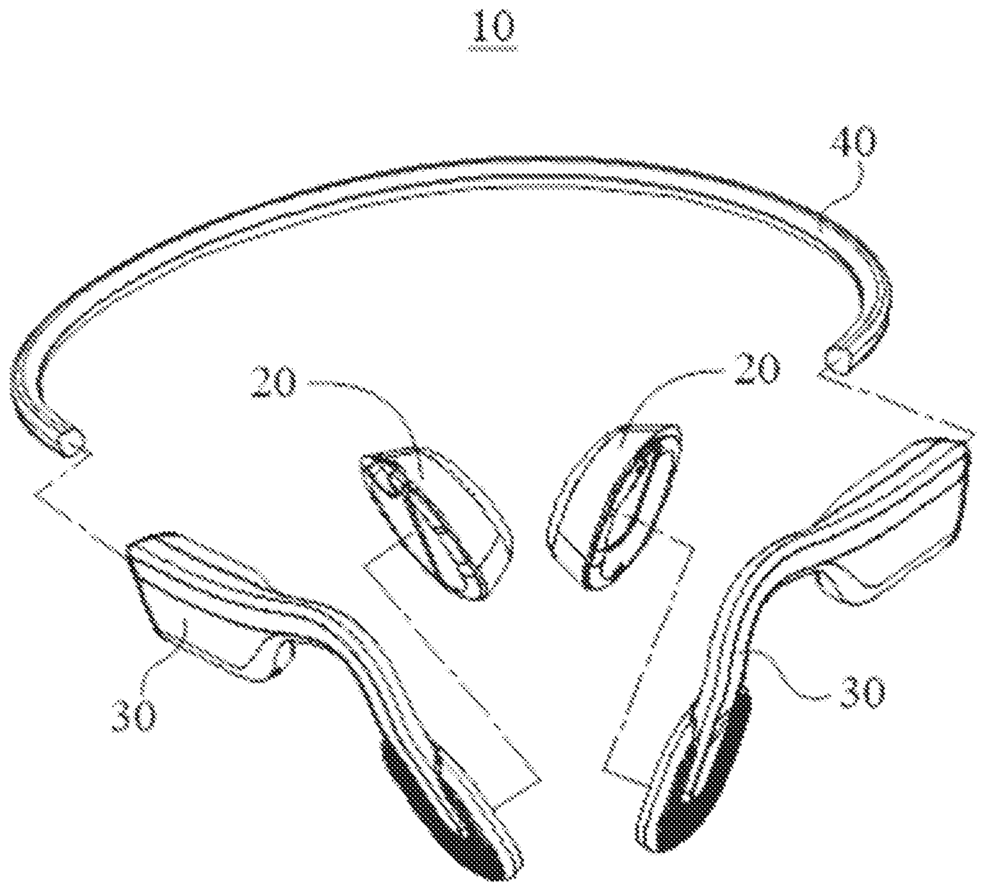
FIG. 1 is a schematic diagram illustrating a structure of a sound producing device according to some embodiments of the present disclosure.

In order to more clearly illustrate the technical solutions related to the embodiments of the present disclosure, a brief introduction of the drawings referred to the description of the embodiments is provided below. Obviously, the drawings described below are only some examples or embodiments of the present disclosure. Those having ordinary skills in the art, without further creative efforts, may apply the present disclosure to other similar scenarios according to these drawings. Unless obviously obtained from the context or the context illustrates otherwise, the same numeral in the drawings refers to the same structure or operation.

It should be understood that the "system," "device," "unit," and/or "module" used herein are one method to distinguish different components, elements, parts, sections, or assemblies of different levels. However, if other words can achieve the same purpose, the words can be replaced by other expressions.

As used in the disclosure and the appended claims, the singular forms "a," "an," and "the" include plural referents unless the content clearly dictates otherwise; the plural forms may be intended to include singular forms as well. In general, the terms "comprise," "comprises," and/or "comprising," "include," "includes," and/or "including," merely prompt to include steps and elements that have been clearly identified, and these steps and elements do not constitute an exclusive listing. The methods or devices may also include other steps or elements.

Some embodiments of the present disclosure describes a sound producing device that includes at least a housing assembly. In some embodiments, the housing assembly may include a housing and a sealing member. The housing may be provided with a plug-in hole. The plug-in hole may penetrate through a side wall of one side of the housing. The sealing member may be configured to plug and seal the plug-in hole. The plug-in hole may include at least one hole wall segment disposed along a plugging direction of the sealing member. The sealing member may be plugging fit with the at least one hole wall segment so as to achieve waterproof and dustproof performance of the housing assembly. In some embodiments, a cross-sectional area of at least part of a structure of the at least one hole wall segment on a reference section perpendicular to the plugging direction of the sealing member may gradually increase along the plugging direction. The sealing member may elastically abut against at least part of the structure of the hole wall segment, which may not only seal the plug-in hole to enhance waterproof and dustproof performance of the housing assembly, but may also be blocked by the at least part of the structure in an opposite direction of the plugging direction, thereby preventing the sealing member from withdrawing from the plug-in hole due to elastic recovery.

In some embodiments, the sound producing device may include a charging assembly. The charging assembly may include an interface, a processing chip, a battery management module, and a battery. The interface may include at least one charging pin and at least one burning pin. The interface may realize a charging function through the at least one charging pin, and realize a burning function through the at least one burning pin, so that the interface may realize the charging and burning function of the sound producing device at the same time. Thus, there may be no need to dispose another charging interface, so as to reduce the cost.

In some embodiments, the sound producing device may include a device with an acoustic output capability such as a hearing aid, a listening bracelet, an earphone (e.g., a bone conduction earphone, an air conduction earphone), a speaker, smart glasses, a mobile phone, a computer, etc. For example, the sound producing device may be an earphone. In some embodiments, the sound producing device may be worn on a user's head or other parts (e.g., an area of the user's neck, shoulder, etc.) through a structure such as a fixed structure (e.g., an ear hook) to provide the user with audio information. In some embodiments, the sound producing device may also be combined with other wearable devices (e.g., a smart helmet, glasses, etc.) to be worn on the user's head or other parts. In some embodiments, the sound producing device may be a bone conduction earphone. The bone conduction earphone may be close to but not block the user's ear(s), so that the user may better perceive sound information of an outside world while listening to sound played by the sound producing device. The bone conduction earphone may convert audio signals into mechanical vibrations of different frequencies, and then transmit sound waves to auditory nerves by using human bones or muscles as a medium that transmits the mechanical vibrations, so that the user may receive sound without passing through an ear's external canal and a tympanic membrane. In some embodiments, the sound producing device may be an air conduction earphone. The air conduction earphone may also be close to but not block the user's ear(s), so that the user may better perceive sound information of an outside world while listening to sound played by the sound producing device. The air conduction earphone may convert audio signals into sound signals of different frequencies, and the sound may be received through an ear's external canal and a tympanic membrane of the user by using air as a medium.

In some embodiments, the sound producing device may be a unilateral suspension structure or a bilateral suspension structure. The unilateral suspension structure may refer to a structure that may be suspended on one side of the user's head (e.g., an ear, a face). For example, when the sound producing device is a unilateral suspension structure, the sound producing device may be suspended on a left ear or a right ear of the user. The bilateral suspension structure may refer to a structure that may be suspended on both sides of the user's head (e.g., an ear, a face). For example, when the sound producing device is a bilateral suspension structure, the sound producing device may be suspended on a left ear and a right ear of the user. In some embodiments, the sound producing device may include at least one core and at least one housing assembly. Each core may be connected to a housing assembly. The housing assembly may secure the sound producing device to a part of the user. For example, the housing assembly may be suspended near the user's ear. In some embodiments, the housing assembly may be a housing structure having a shape matched with a human ear, such as a circular ring, an oval, a (regular or irregular) polygonal, a U-shape, a V-shape, a semi-circle, etc., and the housing assembly may be directly anchored at the user's ear. In some embodiments, the sound producing device may also include one or more suspension components, which may be connected to at least one housing assembly to secure the sound producing device on the user's head or other parts. For the convenience of description, an exemplary illustration is given as follows by taking a bone conduction earphone whose sound producing device is a bilateral suspension structure as an example. FIG. 1 is a schematic diagram illustrating a structure of a sound producing device according to some embodiments of the present disclosure. As shown in FIG. 1, the sound producing device 10 may include two cores 20, two housing assemblies 30, and a suspension component 40. One end of each housing assembly 30 may be connected to a corresponding core 20. Two ends of the suspension component 40 may be respectively connected to the other ends of the two housing assemblies 30 away from the core 20.

In some embodiments, each housing assembly 30 may be curved to be hung over a user's ear. The suspension component 40 may also be curved, and may be wound around back of the user's head to satisfy the user's requirement of wearing the sound producing device 10. When the sound producing device 10 is being worn, the two cores 20 may be respectively located on the left and right sides of the user's head. Under cooperative action of the two housing assemblies 30 and the suspension component 40, the two cores 20 may clamp the user's head and make contact with user's skin, so that sound may be transmitted based on bone conduction technology.

It should be noted that in order to achieve a stereo sound effect, the sound producing device 10 may include two cores 20 that may both output sound, so as to improve acoustic performance of the sound producing device 10. In other high application scenarios that do not have particularly high requirements on stereo, such as hearing aid for a hearing patient, (host) live teleprompter, etc., the sound producing device 10 may also only be provided with one core 20.

Figure 2:
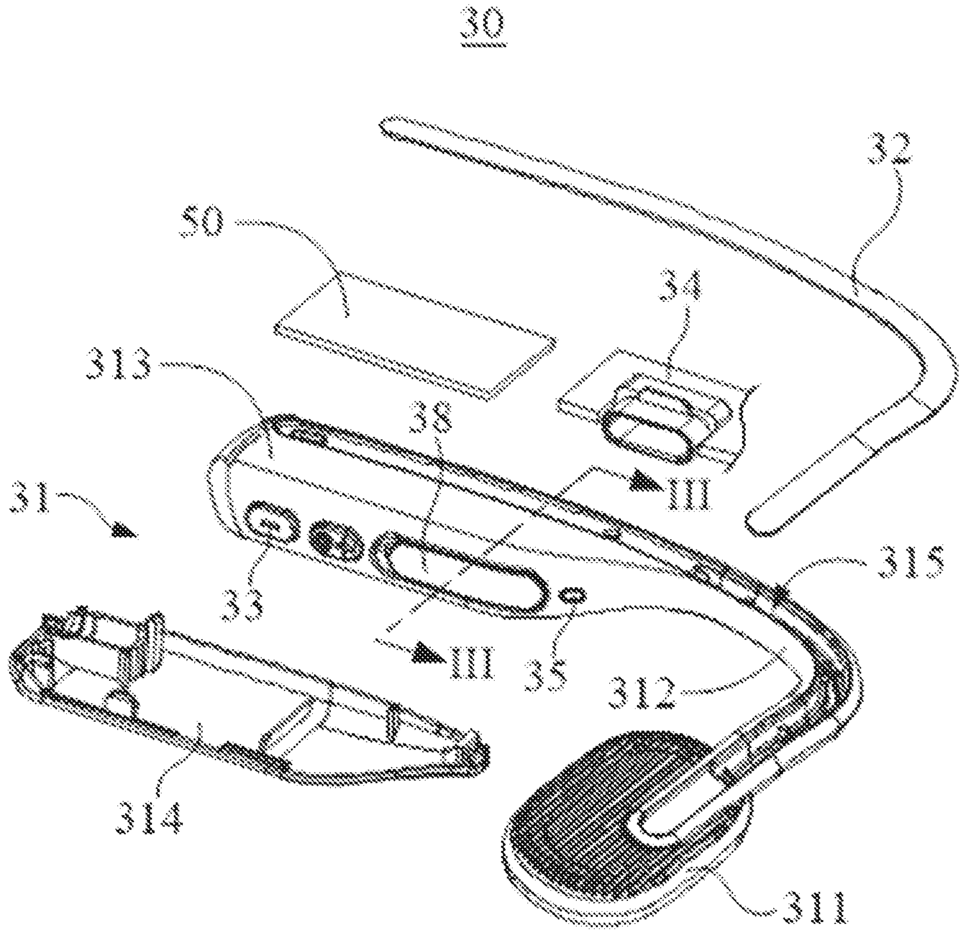
FIG. 2 is a schematic exploded view illustrating a structure of a housing assembly according to some embodiments of the present disclosure.

FIG. 2 is a schematic exploded view illustrating a structure of a housing assembly 30 according to some embodiments of the present disclosure. As shown in FIG. 2, in some embodiments, the sound producing device 10 may also include a main board 50 and a battery (not shown in FIG. 2). The main board 50 and the battery may be connected to the two cores 20 through a corresponding conductor. The main board 50 may be configured to control sound (e.g., convert electrical signals into mechanical vibrations) of the core 20. The battery may be configured to power one or more components (e.g., the two cores 20) of the sound producing device 10.

In some embodiments, the main board 50 and the battery may be respectively disposed in the two housing assemblies 30. For example, the main board 50 and the battery may be respectively disposed in the two housings 31 (as shown in FIG. 2), which may not only increase capacity of the battery to improve a battery life of the sound producing device 10, but also may balance a weight of the sound producing device 10 to improve comfort of the sound producing device 10.

In some embodiments, when the sound producing device 10 is being worn, the sound producing device 10 may be hung outside human ears. Specifically, the core 20 may be located on the front side of the human ear. The main board 50 or the battery may be located on the back side of the human ear. The human ear, as a fulcrum, may support the sound producing device 10, so that the human ear may bear most of the weight of the sound producing device 10. A user may experience discomfort after wearing the sound producing device 10 for a long time. Therefore, a contact part (e.g., the housing 31 shown in FIG. 2, especially a bending transitional part 312) of the housing assembly 30 with the human ear may be made of a relatively soft material, so as to improve the wearing comfort of the sound producing device 10.

Figure 10:
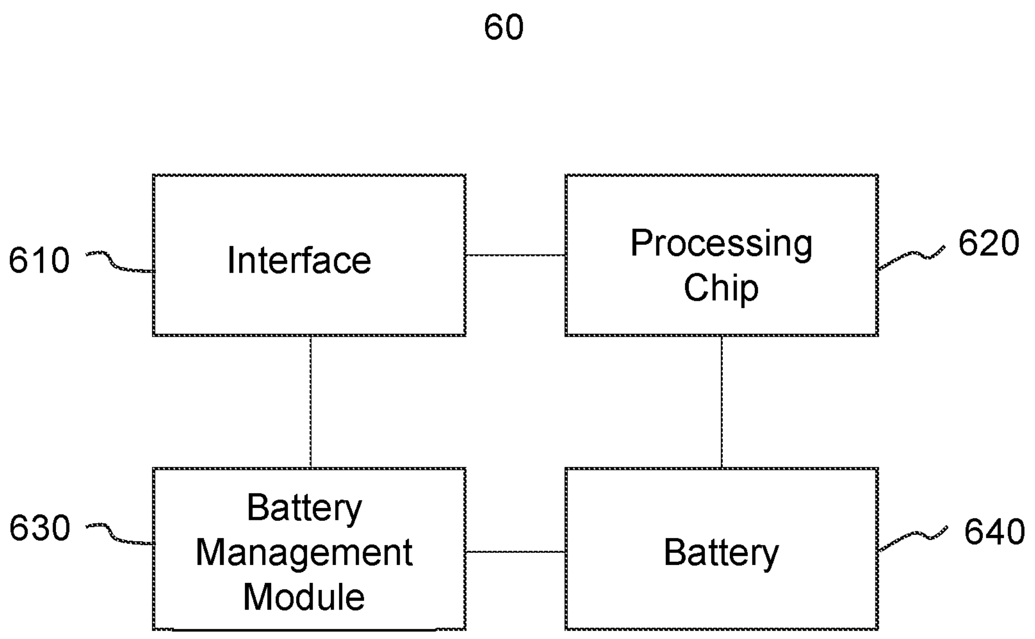
FIG. 10 is a schematic diagram illustrating a structure of a charging assembly according to some embodiments of the present disclosure.

In some embodiments, the sound producing device 10 may include a charging assembly (e.g., a charging assembly 60 shown in FIG. 10). The charging assembly may be disposed in the housing assembly 30. The charging assembly may be configured to charge the sound producing device 10. In some embodiments, the charging assembly may be configured for data transmission of the sound producing device 10. Detailed description regarding the charging assembly 60 may be found in FIG. 10, which will not be repeated herein.

In some embodiments, the sound producing device 10 may include a sound transmitter such as a microphone, a pickup, a speaker, etc. In some embodiments, the sound producing device 10 may include a communication device, such as a Bluetooth, a near-field communication (NFC), etc. The communication device may be electrically connected to the main board 50 and the battery through a corresponding conductor to achieve a corresponding function. For example, the communication device may obtain audio signals in a wireless or wired manner. In some embodiments, the pickup, the microphone, the communication device, etc. may be disposed in the housing assembly 30, or may be disposed in other components of the sound producing device 10. For example, the microphone and the speaker may also be disposed in the core 20.

As shown in FIG. 2, the housing assembly 30 may include the housing 31 and a sealing member 38. In some embodiments, the housing assembly 30 may also include a decorative member 32, a control key 33, an interface 34, an indicator light 35, or the like, or any combination thereof.

In some embodiments, the housing 31 may include a fixing part 311, a bending transition part 312, and an accommodating bin 313. The fixing part 311 and the accommodating bin 313 may be respectively connected to both ends of the transition part 312. The fixing part 311 may be configured to fix the core 20. In some embodiments, the fixing part 311 and the core 20 may be fixed by an assembly manner such as a glue connection, a snap connection, rivet connection, or the like, or any combination thereof. In some embodiments, the transition part 312 may be curved, so that the housing assembly 30 may be hung outside human ears. In some embodiments, one end of the accommodating bin 313 away from the fixing part 311 may be connected to the suspension component 40 by an assembly manner such as a glue connection, a snap connection, a screw connection, or the like, or any combination thereof, so as to realize assembly between the housing assembly 30 and the suspension component 40.

Figure 3:
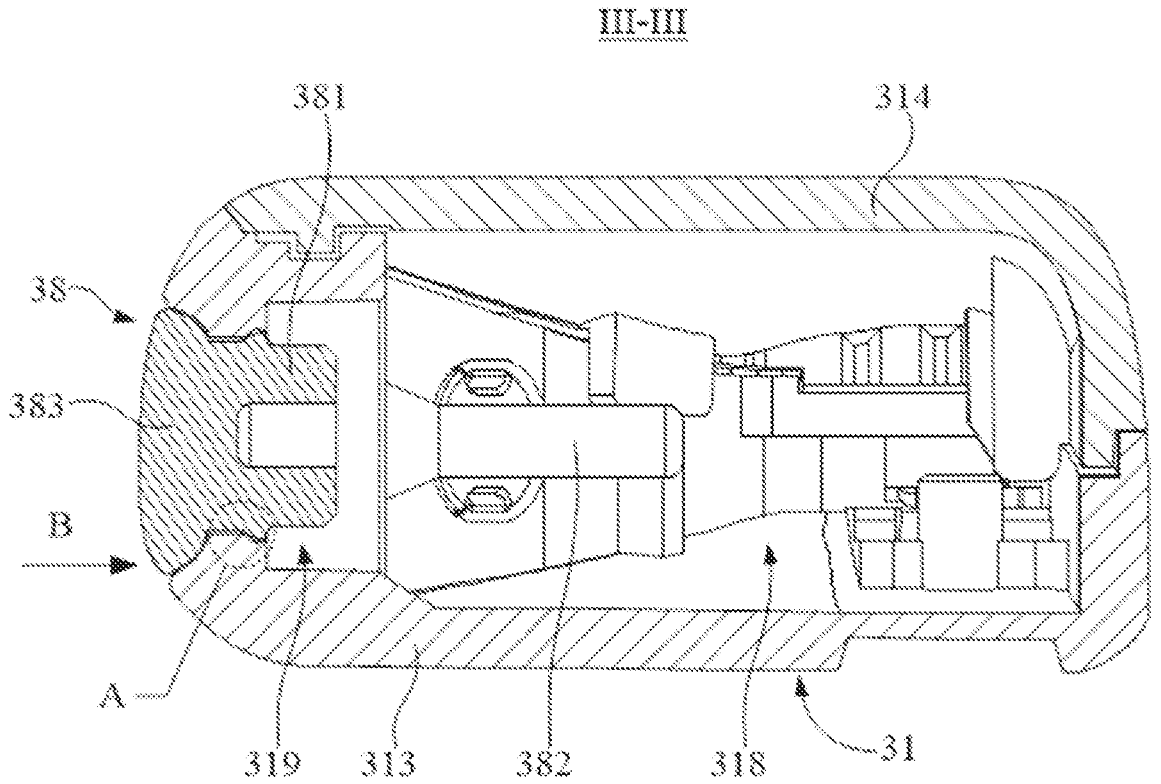
FIG. 3 is a schematic diagram illustrating a cross-sectional structure of the housing assembly in FIG. 2 with III-Ill as a section line according to some embodiments of the present disclosure.

In some embodiments, one end of the accommodating bin 313 may be open, and may be configured to accommodate the main board 50 and the charging assembly or the battery. In some embodiments, the housing 31 may also include a bin body cover 314. The bin body cover 314 may be covered on the open end of the accommodating bin 313. As shown in FIG. 3, FIG. 3 is a schematic diagram illustrating a cross-sectional structure of the housing assembly 30 in FIG. 2 with III-III as a section line according to some embodiments of the present disclosure. A direction indicated by an arrow B in FIG. 3 may be approximately regarded as a plugging direction of the sealing member 38. The housing 31 (or the accommodating bin 313) may be configured to form an accommodating cavity 318. The bin body cover 314 may be covered on an open end of the accommodating bin 313. In some embodiments, the housing 31 (or the accommodating bin 313) may be provided with a plug-in hole 319. The plug-in hole 319 may penetrate through a side wall of one side of the housing 31, that is, the plug-in hole 319 may be connected to the accommodating cavity 318. In some embodiments, the plug-in hole 319 may be disposed on the bin body cover 314. The sealing member 38 may plug the bin body cover 314 through the plug-in hole 319. At this time, the bin body cover 314 may be simply regarded as the housing described in the present disclosure.

In some embodiments, the plug-in hole 319 may include at least one hole wall segment disposed in the plugging direction of the sealing member 38. In some embodiments, a cross-sectional area of at least part of a structure (also referred to as a stop structure) of the at least one hole wall segment on a reference section perpendicular to the plugging direction of the sealing member 38 may gradually increase along the plugging direction. When the sealing member 38 enters the hole wall segment of the plug-in hole 319 along the plugging direction, a protruding structure at an end (e.g., an insertion part 381 shown in FIG. 4) of the sealing member 38 entering the plug-in hole 319 may abut against the stop structure of the hole wall segment, so that the sealing member 38 may be plugging fit with the plug-in hole 319.

Figure 4:
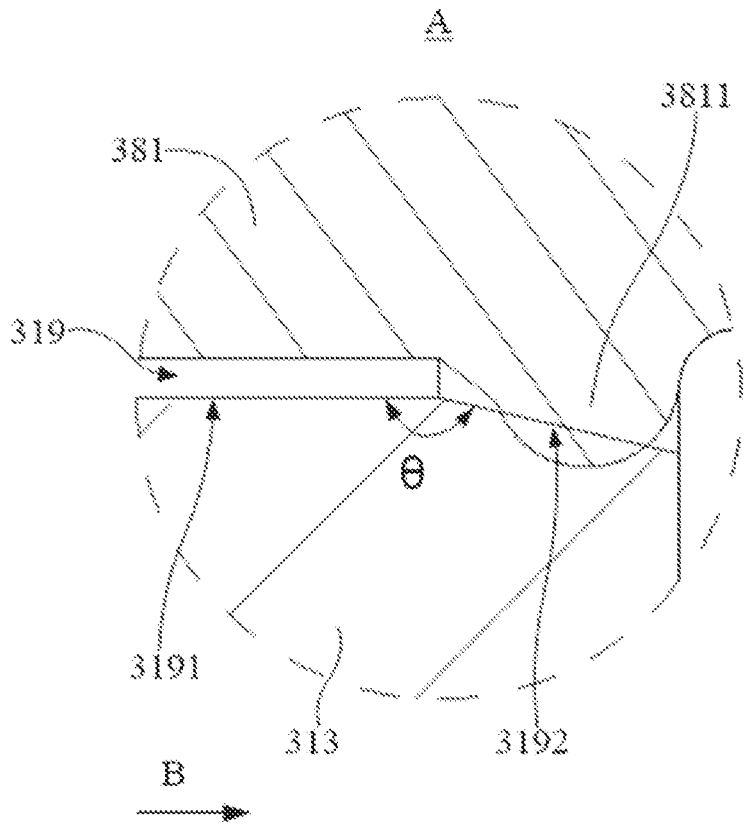
FIG. 4 is a partial enlargement structural schematic diagram illustrating a part A in FIG. 3 according to some embodiments of the present disclosure.

In some embodiments, the stop structure of the at least one hole wall segment may include a part of a structure of a hole wall segment or a structure of a hole wall segment of a plurality of hole wall segments. For example, when the plug-in hole 319 includes only a hole wall segment, a part of the hole wall segment close to an external environment may be a cylindrical structure, and a cross-sectional area of a part of the hole wall segment facing away from the external environment on the reference section perpendicular to the plugging direction of the sealing member 38 may gradually increase along the plugging direction (approximately regarded as "trumpet-shaped"). As another example, when the plug-in hole 319 includes two or more holes wall sections, a cross-sectional area of the hole wall segment close to the accommodating cavity 318 on the reference section perpendicular to the plugging direction of the sealing member 38 may gradually increase along the plugging direction, and a hole wall segment facing away from the accommodating cavity 318 may be a cylindrical structure. FIG. 4 is a partial enlargement structural schematic diagram illustrating a part A in FIG. 3. Merely taking a hole wall segment including a first hole wall segment and a second hole wall segment as an example, as shown in FIG. 4, the plug-in hole 319 may include a first hole wall segment 3191 and a second hole wall segment 3192 connected in sequence along a plugging direction of the sealing member 38 (a direction indicated by an arrow B in FIG. 4). An included angle between the second hole wall segment 3192 and the first hole wall segment 3191 may be an obtuse angle on a reference plane parallel to the plugging direction (such as a plane where the accommodating bin 313 and the sealing member 38 are located in FIG. 4), and the cross-sectional area of the second hole wall segment 3192 on a reference section (e.g., a plane perpendicular to the above-mentioned reference plane in FIG. 4) perpendicular to the plugging direction may gradually increase along the plugging direction, that is, the second hole wall segment 3192 may be trumpet-shaped compared to the first hole wall segment 3191. For example, as shown in FIG. 4, the included angle between the second hole wall segment 3192 and the first hole wall segment 3191 on the reference plane may be θ. In some embodiments, the included angle θ may be greater than or equal to a first angle threshold and less than a second angle threshold. In some embodiments, the first angle threshold and/or the second angle threshold may be determined by taking into account waterproof and dustproof requirements of the sealing member 38 for the housing 31 and a requirement of the housing 31 to prevent the sealing member 38 from retreating. For example, $155° \leq \theta \leq 180°$. As another example, $160° \leq \theta \leq 170°$. As yet another example, $\theta = 166°$.

In some embodiments, in order to improve comfort of the user when wearing the sound producing device 10, a relatively soft material may be chosen for a side wall of the housing 31 that is in contact with the user when wearing it. For example, the material of the housing 31 may include Polycarbonate (PC), Polyam ides (PA), Acrylonitrile Butadiene Styrene (ABS), Polystyrene (PS), High Impact Polystyrene (HIPS), Polypropylene (PP), Polyethylene Terephthalate (PET), Polyvinyl Chloride (PVC), Polyurethanes (PU), Polyethylene (PE), Phenol Formaldehyde (PF), Urea-Formaldehyde (UF), Melamine-Formaldehyde (MF), silica gel, or the like, or any combination thereof. In some embodiments, due to the soft texture of the housing 31, there may be a risk that the housing 31 has insufficient rigidity and is difficult to maintain its structure under action of external force, and even a risk of breaking due to insufficient strength. Therefore, an elastic metal wire (not shown in FIG. 4) may be built in the housing 31 (at least in the bending transition part 312) to improve strength of the housing 31 and increase reliability of the housing 31. In some embodiments, a material of the elastic metal wire may include a spring steel, a titanium alloy, a titanium-nickel alloy, a chrome-molybdenum steel, etc. In some embodiments, the housing 31 may include a metal insert injection integrally formed structural member.

In some embodiments, the decorative member 32 may be assembled with the housing 31 by an assembly manner such as a glue connection, a snap connection, a rivet connection, or the like, or any combination thereof. When the sound producing device 10 is being worn, the decorative member 32 may be located on a side of the housing 31 away from the core 20, that is, on the outside of the sound producing device 10, the housing 31 may be decorated with a decorative member 32 to improve aesthetic appearance of the sound producing device 10. In some embodiments, because the main board 50 or the battery and the core 20 are disposed at two ends of the housing 31, a wiring groove 315 for passing a conductor may be provided at least in the bending transition part 312 of the housing 31. At this time, the decorative member 32 may be embedded in the wiring groove 315 to cover the conductor in the wiring groove 315, which may not only improve the aesthetic appearance of the sound producing device 10, but also may easily dispose a wiring structure.

The control key 33 and the interface 34 may be electrically connect to the main board 50. In some embodiments, the control key 33 and the interface 34 may be disposed in the accommodating bin 313 (or the accommodating cavity 318) to shorten a wiring distance with the main board 50. The control key 33 may be partially exposed outside the housing 31 to realize a function such as turning on, turning off the sound producing device 10, adjusting volume, etc. In some embodiments, the interface 34 may be disposed corresponding to the plug-in hole 319, that is, the interface 34 may be connected to the external environment through the plug-in hole 319 to achieve a function such as data transmission, charging, etc. In some embodiments, the interface 34 may include a TYPE-A interface, a TYPE-B interface, a TYPE-C interface, a USB interface, a Lighting interface, etc. In some embodiments, the interface 34 may include a pogo-PIN component, which may also implement the function such as data transmission, charging, etc. It should be noted that the interface 34 is a part of the in the charging assembly. Detailed descriptions regarding the charging assembly may be found elsewhere (e.g., FIG. 10 and relevant descriptions thereof) in the present disclosure.

The indicator light 35 may be disposed on the accommodating bin 313 to facilitate connection with the main board 50 and shorten the wiring distance. In some embodiments, as shown in FIG. 2, the indicator light 35 may be partially exposed outside the housing 31 to indicate that the sound producing device 10 is being charged, the battery is insufficient, etc.

The sealing member 38 may be configured to plug and seal the plug-in hole 319. That is, the sealing member 38 may plug the accommodating bin 313 via the plug-in hole 319, so as to increase the waterproof and dustproof performance of the housing assembly 30 herein, especially when the interface 34 is not used. In some examples, the sealing member 38 may be a material with elastic variation. For example, the material of the sealing member 38 may include polytetrafluoroethylene, rubber (e.g., natural rubber, silicone rubber, ethylene-propylene rubber, nitrile rubber, fluorinated rubber, etc.), etc.

In some embodiments, the sealing member 38 may include the insertion part 381 configured to insert into the plug-in hole 319. The insertion part 381 may be plugging fit with at least one hole wall segment of the plug-in hole 319. In some embodiments, the insertion part 381 may include at least one protruding structure. The protruding structure may be distributed on an end face or a peripheral side of one end of the plug-in hole 319 in the insertion part 381. The protruding structure may abut against the at least one hole wall segment when the insertion part 381 is inserted into the plug-in hole 319. For example, the insertion part 381 may form abutment with a terminal hole wall segment of the at least one hole wall segment, thereby realizing sealing of the plug-in hole 319. The terminal hole wall segment may refer to a last hole wall segment of the at least one hole wall segment along the plugging direction of the sealing member 38, for example, the second hole wall segment 3192 described in FIG. 4. In some embodiments, the abutment may be an elastic abutment. When the at least one protruding structure forms the elastic abutment with the at least one hole section, each protruding structure that forms the elastic abutment may undergo a certain degree of elastic compression deformation, so as to be in close contact with the hole wall segment with which the elastic abutment is formed. Only when the protruding structure is an annular protrusion is taken as an example, as shown in FIG. 4, an annular protrusion 3811 may be provided on the insertion part 381. When the insertion part 381 is inserted into the plug-in hole 319, the annular protrusion 3811 may form the elastic abutment with one hole wall segment of the at least one hole wall segments (e.g., the second hole wall segment 3192 described in FIG. 4). At this time, at least the annular protrusion 3811 may undergo a certain degree of elastic compression deformation, so as to be in close contact with the hole wall segment with which the elastic abutment is formed. In some embodiments, deformation amount of the elastic compression deformation may be determined by taking into account the waterproof and dustproof requirements of the sealing member 38 for the housing 31 and a requirement for plugging and unplugging. For example, the deformation amount of the elastic compression deformation may be 0.1-0.3 mm. As another example, the deformation amount of the elastic compression deformation may be 0.2 mm. In some embodiments, as mentioned above, a cross-sectional area of a stop structure of the at least one hole wall segment on a reference section perpendicular to the plugging direction of the sealing member may gradually increase along the plugging direction. The annular protrusion 3811 may form an elastic abutment with the stop structure, so that the sealing member 38 may not only seal the plug-in hole 319 to improve the waterproof and dustproof performance of the housing assembly 30, but also be blocked by the stop structure of the at least one hole wall segment in the opposite direction of the plugging direction, thereby preventing the sealing member from withdrawing from the plug-in hole 319 due to elastic recovery, that is, the sealing member 38 may be blocked by the housing 31 after plugging the plug-in hole 319. For example, as shown in FIG. 4, the included angle between the second hole wall segment 3192 and the first hole wall segment 3191 may be an obtuse angle, and the second hole wall segment 3192 may gradually expand along the plugging direction and may be trumpet-shaped compared to the first hole wall segment 3191. Therefore, when the annular protrusion 3811 forms an elastic abutment with the second hole wall segment 3192, the sealing member 38 may be blocked by the second hole wall segment 3192.

In some embodiments, a count of the at least one protruding structure may be determined based on a count of the at least one hole wall segment. For example, when the at least one hole wall segment includes only one hole wall segment, only one protruding structure abutting against the hole wall segment may be provided. As another example, when the at least one hole wall segment includes two or more hole wall segments, one or more protruding structures abutting against the hole wall segment may be provided. As yet another example, a plurality of protruding structures may be disposed side by side at an interval in the plugging direction of the sealing member 38, and the at least one protruding structure may form an elastic abutment with the second hole wall segment 3192. As still yet another example, the insertion part 381 may be provided with two protruding structures. One of the protruding structures may form an elastic abutment with the second hole wall segment 3192, and the other protruding structure may form an elastic abutment with the first hole wall segment 3191, so as to improve waterproof and dustproof of the housing 31 of the sealing member 38. It should be noted that the protruding structure is not limited to the above-mentioned annular protrusion 3811. The shape of the protruding structure may be adaptively adjusted according to a shape of the hole wall segment.

It should be noted that after the insertion part 381 is taken out from the plug-in hole 319, the interface 34 (shown in FIG. 2) is exposed through the plug-in hole 319, so that a function such as data transmission, charging, etc. of the sound producing device 10 may be realized via the interface 34.

Figure 5:
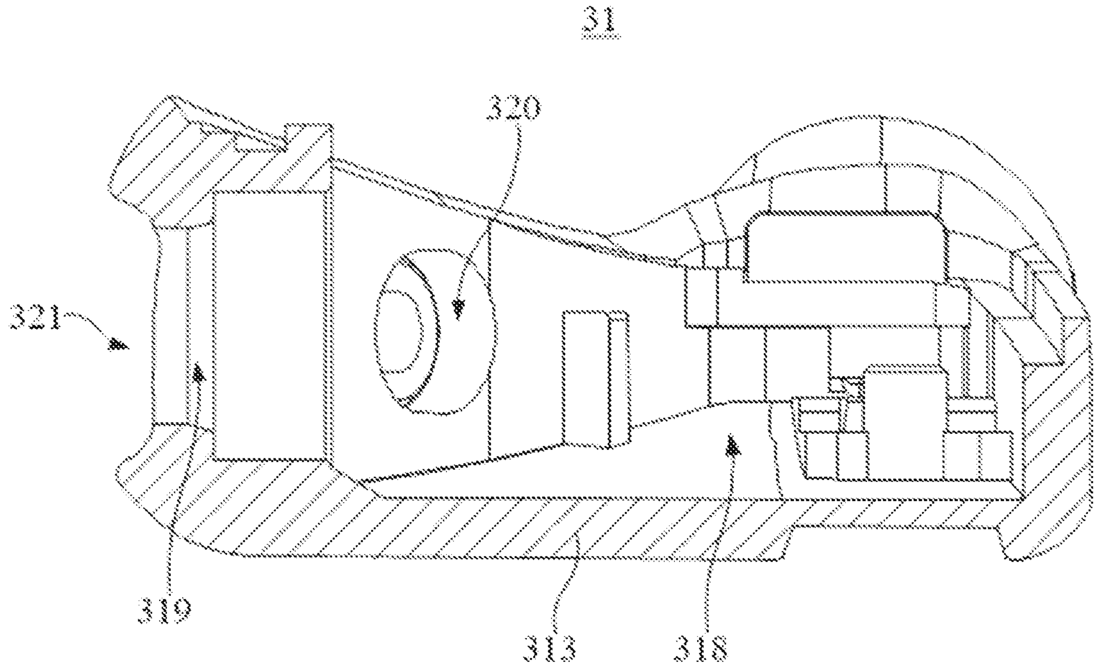
FIG. 5 is a schematic diagram illustrating a cross-sectional structure of a housing shown in FIG. 3 according to some embodiments of the present disclosure.
Figure 6:
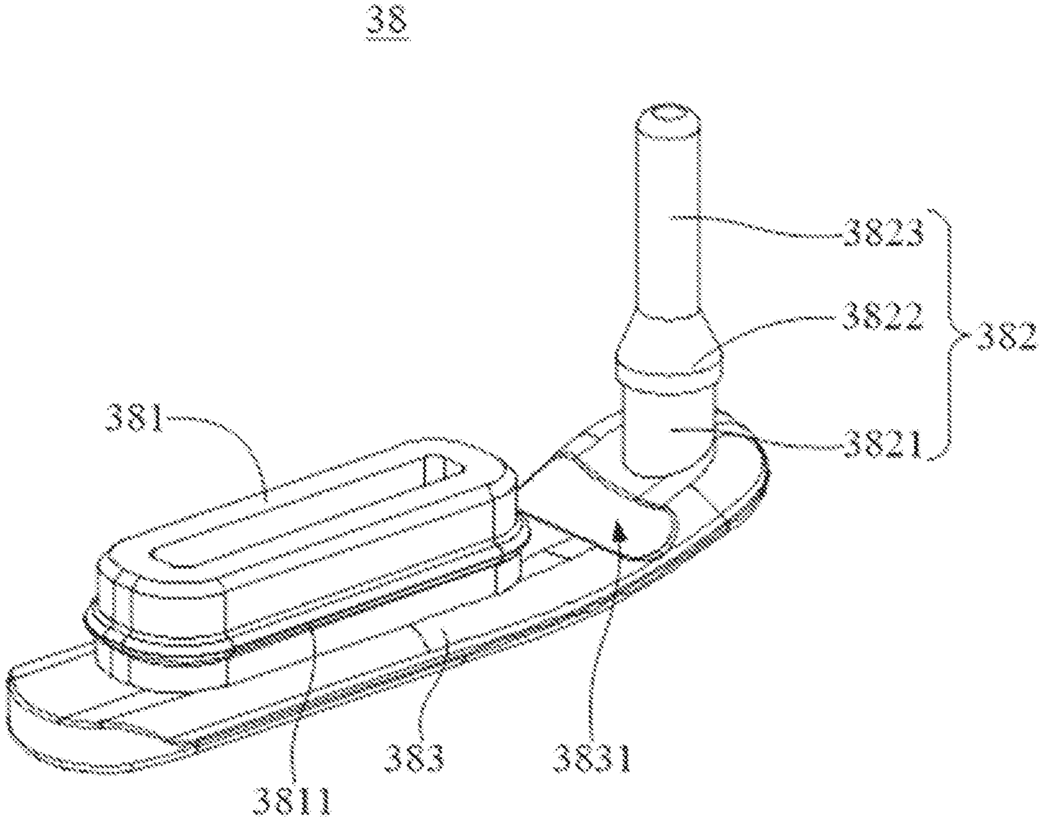
FIG. 6 is a schematic diagram illustrating a structure of a sealing member according to some embodiments of the present disclosure.
Figure 7:
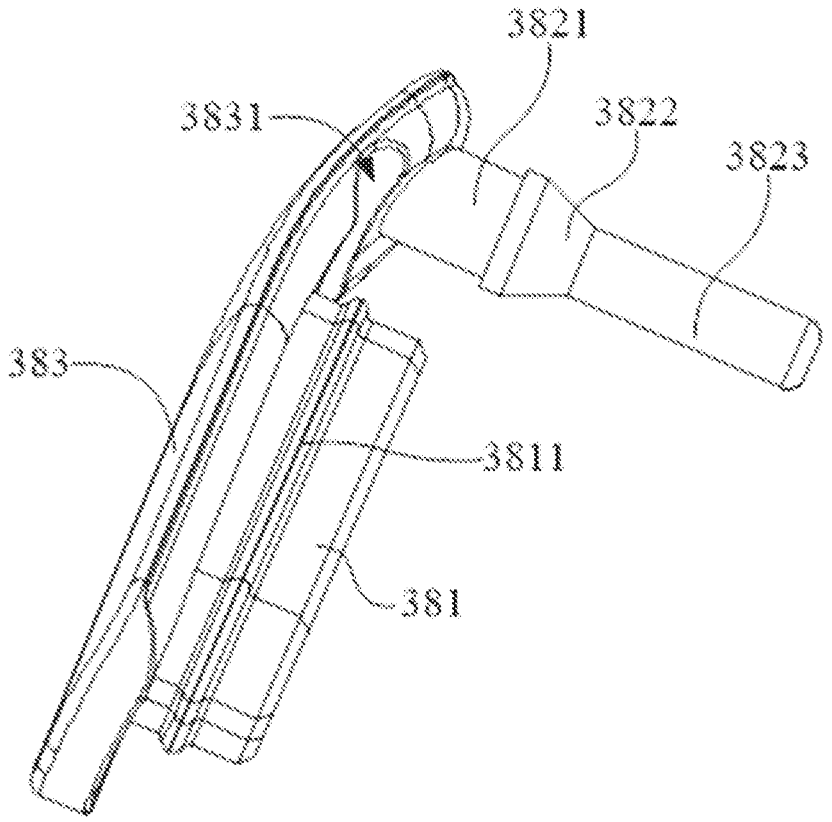
FIG. 7 is a schematic diagram illustrating a structure of a sealing member according to some embodiments of the present disclosure.

FIG. 5 is a schematic diagram illustrating a cross-sectional structure of a housing shown in FIG. 3 according to some embodiments of the present disclosure. FIG. 6 and FIG. 7 are schematic diagrams illustrating a structure of a sealing member according to some embodiments of the present disclosure. As shown in FIG. 5, in some embodiments, the housing 31 may also include a mounting hole 320. When the interface 34 (shown in FIG. 2) is in a use state of data transmission, charging, etc., that is, after the insertion part 381 is taken out from the plug-in hole 319, the sealing member 38 may be fixed on the housing 31 through the mounting hole 320 to prevent the sealing member 38 from being completely separated from the housing 31 and falling out.

In some embodiments, combined with FIG. 5 to FIG. 7, the sealing member 38 may include an assembly part 382 that fits with the mounting hole 320. The assembly part 382 may be connected to the insertion part 381. In some embodiments, the insertion part 381 may be integrally connected to the assembly part 382 or connected in other ways. The assembly part 382 may be fixed connected to the mounting hole 320, that is, the assembly part 382 may plug the mounting hole 320 and fixed to the housing 31. In some embodiments, a fixed connection manner of the assembly part 382 and the mounting hole 320 may include a snap connection, a bonding connection, a welding connection, a bolt-hole connection, or the like, or any combination thereof.

As shown in FIG. 6 and FIG. 7, the sealing member 38 may include a connecting part 383 configured to connect the insertion part 381 and the assembly part 382. The insertion part 381 and the assembly part 382 may be disposed on a surface of a same side of the connecting part 383. In some embodiments, the connecting part 383 may be provided with a thinning structure 3831, so that an average thickness of the connecting part 383 at the thinning structure 3831 may be smaller than an average thickness of other parts of the connecting part 383. In some embodiments, the thinning structure 3831 may be located between the insertion part 381 and the assembly part 382, so that the insertion part 381 may be bent relative to the assembly part 382 through the thinning structure 3831 to facilitate the user to take out the insertion part 381 from the plug-in hole 319. As an example, the thinning structure 3831, the insertion part 381 and the assembly part 382 may be located on the surface of the same side of the connecting part 383, so that after the sealing member 38 plugs the plug-in hole 319, the thinning structure 3831 may be not visible in order to increase consistency of appearance structure of the sealing member 38. In some embodiments, the thinning structure 3831, the insertion part 381 and the assembly part 382 may also be located on surfaces of different sides of the connecting part 383. In some embodiments, the average thickness of the connecting part 383 at the thinning structure 3831 may be similar to the average thickness of the other parts of the connecting part 383. At this time, the insertion part 381 may be bent relative to the assembly part 382 by changing a material of the connecting part 383 at the thinning structure 3831. For example, the material of the connecting part 383 at the thinning structure 3831 may be an elastic material. The other parts of the connecting part 383 may be made of a hard material. At this time, the insertion part 381 may be bent relative to the assembly part 382 through the thinning structure 3831. In some embodiments, a cavity may also be provided at the connecting part 383 between the insertion part 381 and the assembly part 382 to achieve an effect of the thinning structure 3831. In some embodiments, a count of thinning structures 3831 may be one or more. For example, a plurality of thinning structures 3831 may be disposed in an array or unevenly disposed.

As an example, as shown in FIG. 6 and FIG. 7, the assembly part 382 may include a connecting segment 3821, a blocking segment 3822, and a guide segment 3823 that are sequentially connected (e.g., integrally connected). The connecting segment 3821 may be connected to the connecting part 383. The blocking segment 3822 may protrude from the connecting segment 3821 and the guide segment 3823. In some embodiments, a length of the connecting segment 3821 may be approximately equal to a thickness of the housing 31 at the mounting hole 320, and a diameter of the connecting segment 3821 may be slightly smaller than an aperture of the mounting hole 320, so that the assembly part 382 may be mainly inserted into the mounting hole 320 in one direction. After the assembly part 382 is inserted into the mounting hole 320, the blocking segment 3822 and the connecting part 383 may be respectively located on two opposite sides of the housing 31 to prevent the assembly part 382 from falling off from the mounting hole 320, so that the assembly part 382 and the housing 31 may be fixed through a snap connection. In some embodiments, a part of the assembly part 382 in contact with the housing 31 may also be coated with colloid, which may not only increase connection reliability of the two, but also improve the waterproof and dustproof performance of the housing 31 at the mounting hole 320. In other words, the assembly part 382 may always maintain a relatively fixed assembly relationship with the housing 31, and extend from the accommodating cavity 318 to outside of the housing 31. In some embodiments, the assembly part 382 may be a light-transmitting member, for example, a material of the light-transmitting member may be polycarbonate or polyamide, etc., and the light-transmitting member may correspond to the indicator light 35 (shown in FIG. 2) to guide light emitted by the indicator light 35 to the outside of the housing 31, so that the indicator light may prompt when the sound producing device 10 is being charged, the battery is insufficient, etc. At this time, the indicator light 35 may be disposed in the accommodating cavity 318, which may be not visible from the outside of the housing 31. Compared with the structure in which the indicator light 35 is exposed to the housing 31 shown in FIG. 2, one through hole structure corresponding to the indicator light 35 may be not disposed on the housing 31, which may be beneficial to improve the waterproof and dustproof performance of the housing 31.

In some embodiments, the material of the assembly part 382 may be the same as or different from a material of the insertion part 381. When the material of the assembly part 382 is different from the material of the insertion part 381, transmittance of the assembly part 382 to light may be greater than transmittance of the insertion part 381 to light, so that the light emitted by the indicator light 35 may be guided to the outside of the housing 31 by the assembly part 382 as much as possible to prevent the light guided by the assembly part 382 from "leaking" to the insertion part 381. When the material of the assembly part 382 is the same as the material of the insertion part 381, alight blocking member (not shown in the figure) may also be disposed between the assembly part 382 and the insertion part 381, and transmittance of the light blocking member to light may be smaller than transmittance of the assembly part 382 to light, so that light emitted by the indicator light 35 may be guided to the outside of the housing 31 by the assembly part 382 as much as possible to prevent the light guided by the assembly part 382 from being guided to the outside of the housing 31 through the insertion part 381. In some embodiments, the light blocking member may be disposed at the thinning structure 3831. Further, the connecting part between the assembly part 382 and the insertion part 381 may be replaced with the above-mentioned light blocking member.

It should be noted that the guide segment 3823 may mainly play a role in assembly process of the sealing member 38 and the housing 31. For example, the guide segment 3823 may first pass through the mounting hole 320, and then exert a force on the guide segment 3823 to pull the blocking segment 3822 through the mounting hole 320. Therefore, the guide segment 3823 may be cut off after the sealing member 38 is assembled with the housing 31, which may save a volume of the accommodating cavity 318 and facilitate disposing other devices. Based on this, the indicator light 35 may also face and contact an end of the blocking segment 3822 away from the connecting segment 3821 to shorten a distance that light emitted by the indicator light 35 propagates to outside of the housing 31 to reduce loss of light.

As described in connection with FIGS. 5-7, in some embodiments, the housing 31 (specifically the accommodating bin 313) may also be provided with a slot 321. The plug-in hole 319 and the mounting hole 320 may be connected to a bottom of the slot 321. Specifically, in the plugging direction of the sealing member 38, the slot 321 may be located on a side of a first hole wall segment of the at least one hole wall segment facing away from a terminal hole wall segment. For example, the first hole wall segment 3191 may face away from a side of the second hole wall segment 3192. In this way, in a process of inserting the insertion part 381 into the plug-in hole 319, the connecting part 383 may be blocked by the bottom of the slot 321, thereby avoiding the sealing member 38 from "over-inserted." In some embodiments, after the insertion part 381 is inserted into the plug-in hole 319, the connecting part 383 may be accommodated in the slot 321. At this time, the connecting part 383 may be flush with the accommodating bin 313.

Figure 8:
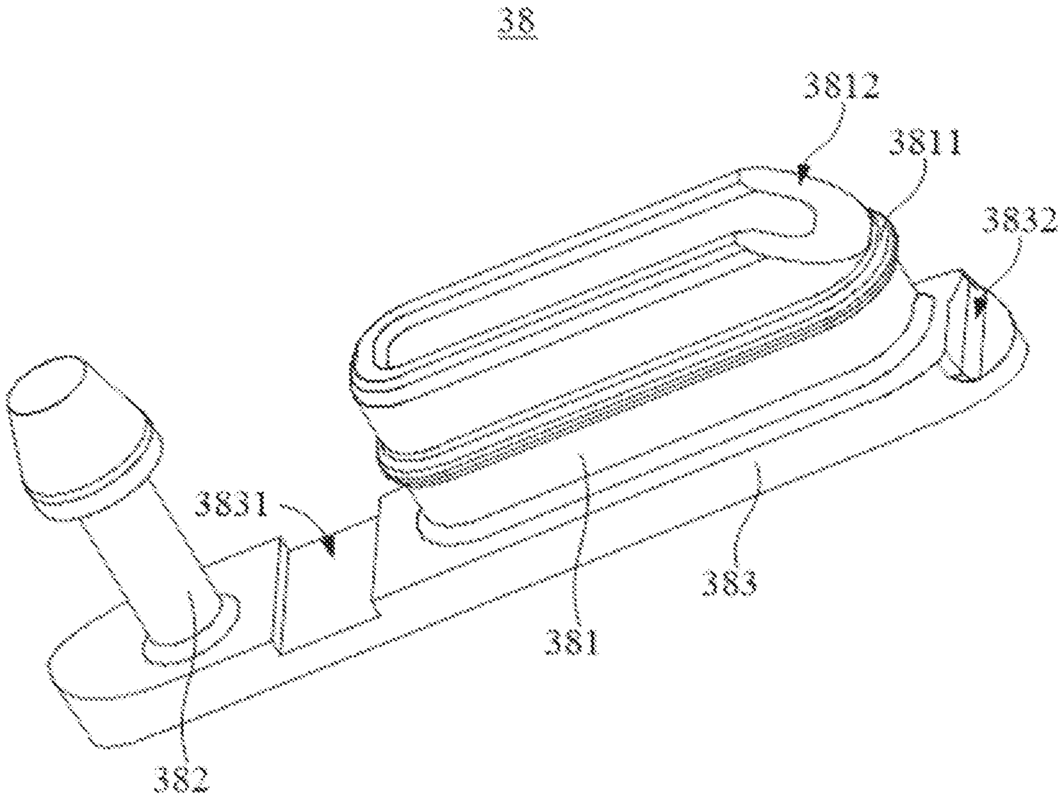
FIG. 8 is a schematic diagram illustrating a structure of a sealing member according to some embodiments of the present disclosure.
Figure 9:
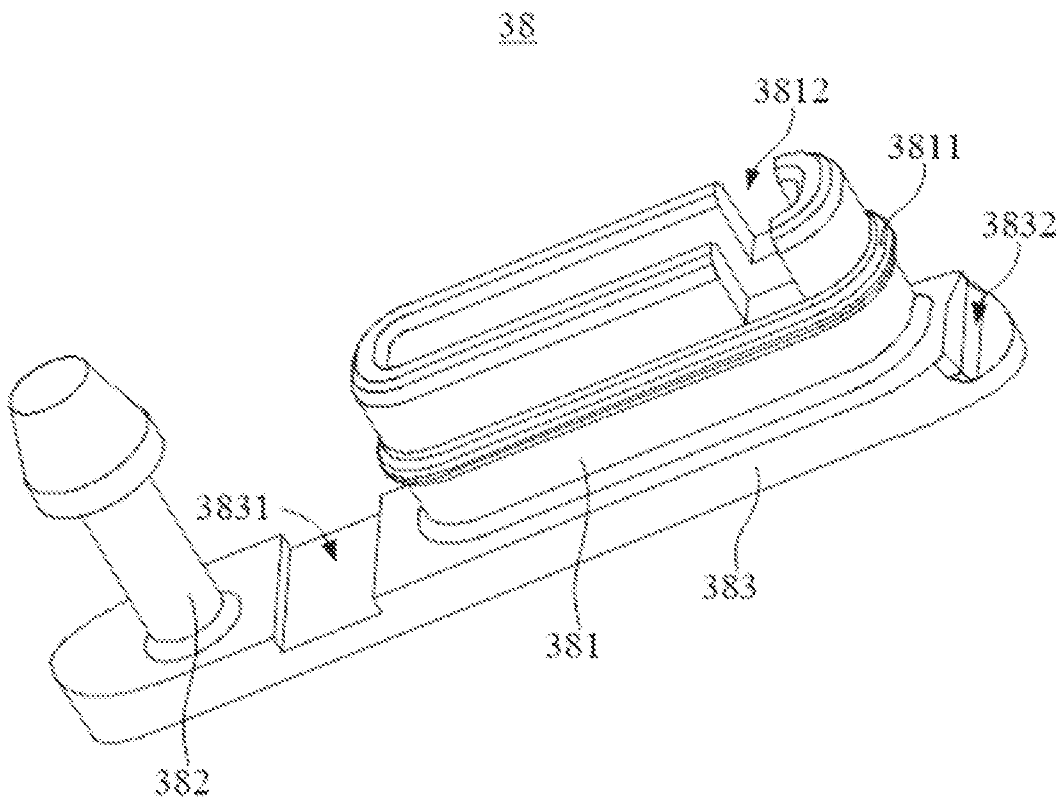
FIG. 9 is a schematic diagram illustrating a structure of a sealing member according to some embodiments of the present disclosure.

After the sealing member 38 shown in FIG. 6 and FIG. 7 is assembled with the housing 31, in a process of removing the insertion part 381 from the plug-in hole 319 by a user, the insertion part 381 may move relative to the assembly part 382 through the thinning structure 3831, that is, a corner of a free end of the insertion part 381 (a side away from the connecting part 383) away from the assembly part 382 may be an arc relative to the moving trajectory of the assembly part 382. In the process, the corner of the free end of the insertion part 381 away from the assembly part 382 may interfere with the housing 31 in structure, especially in a case where a length of the insertion part 381 (that is, a depth at which the insertion part 381 is inserted into the plug-in hole 319) is relatively large. Accordingly, when the user inserts the insertion part 381 into the plug-in hole 319, the corner of the free end of the insertion part 381 away from the assembly part 382 may also interfere with the housing 31 in structure. When the insertion part 381 is inserted into or pulled out of the plug-in hole 319, the corner of the free end of the insertion part 381 away from the assembly part 382 may both interfere with the housing 31 in structure, which may result in time and effort for the user. Therefore, the free end of the insertion part 381 may be provided with an avoidance structure configured to reduce the interference between the corner of the free end of the insertion part 381 away from the assembly part 382 and the housing 31 in a process of inserting the insertion part 381 into the plug-in hole 319 or taking out the insertion part 381 from the plug-in hole 319. In some embodiments, the avoidance structure may be disposed at a corner of away from the assembly part 32. FIG. 8 and FIG. 9 are schematic diagrams illustrating a structure of a sealing member according to some embodiments of the present disclosure. As shown in FIG. 8, in some embodiments, the avoidance structure 3812 may include a corner cut. The corner cut may be disposed at a corner of the free end of the insertion part 381 away from the assembly part 382. As shown in FIG. 9, in some embodiments, the avoidance structure 3812 may include at least one groove. Each of the at least one groove may divide the free end of the insertion part 381 into at least two parts in a circumferential direction.

It should be noted that, as shown in FIG. 8 and FIG. 9, the avoidance structure 3812 may not damage the annular protrusion 3811 as much as possible, so as to ensure structural integrity of the annular protrusion 3811, thereby ensuring waterproof and dustproof of the housing 31 by the sealing member 38.

In some embodiments, the avoidance structure 3812 may also be disposed at a corner of the free end of the insertion part 381 close to the assembly part 382 to make it as convenient as possible for a user to insert the insertion part 381 into the plug-in hole 319 or take the insertion part 381 out of the plug-in hole 319 on the premise of ensuring the waterproof and dustproof of the housing 31 by the sealing member 38.

In some embodiments, as shown in FIG. 8 and FIG. 9, an end of the connecting part 383 facing away from the assembly part 382 may also be provided with a starting position 3832. An average thickness of the connecting part 383 at the starting position 3832 may be smaller than an average thickness of other parts, so that the user may take the insertion part 381 out of the plug-in hole 319. For example, the starting position 3832 may be located on a same side of the connecting part 383 as the insertion part 381 and the assembly part 382, so that after the sealing member 38 plugs the plug-in hole 319, the starting position 3832 may be not visible, so as to increase consistency of appearance structure of the sealing member 38.

The sound producing device 10 may need to perform data burning when converting an audio signal to a sound signal (e.g., bone conduction sound, air conduction sound), for example, burning an application. Usually the sound producing device 10 may only be provided with an interface for burning data, and the sound producing device 10 may be usually powered by a button battery, and the battery may be need to be replaced frequently, which may be inconvenient to operate. When the button battery is replaced with a rechargeable battery, a corresponding charging interface may need to be provided. The sound producing device 10 having both a charging interface and an interface for burning data may increase production cost of the sound producing device 10 and may be inconvenient for a user to operate and use. Based on the above problems, embodiments of the present disclosure provide a charging assembly. The charging assembly may include an interface with a charging pin and a burning pin, and may simultaneously realize charging and burning functions of the sound producing device 10, so that the charging operation of the sound producing device 10 is convenient and simple. In addition, the interface may realize the charging function through the charging pin, and realize the burning function through the burning pin. The two functions may be realized by one interface, and no additional charging interface may be required, which may greatly reduce the production cost of the sound producing device 10, and is also convenient for the user to operate and use. FIG. 10 is a schematic diagram illustrating a structure of a charging assembly 60 according to some embodiments of the present disclosure. The charging assembly 60 may include an interface 610, a processing chip 620, a battery management module 630, and a battery 640. The charging assembly 60 may be located inside the accommodating cavity 318 of the housing 31 (shown in FIG. 2). Descriptions regarding a position of the interface 610 in the housing 31 may be found in descriptions of the interface 34 in FIG. 2.

In some embodiments, the interface 610 may include at least one charging pin and at least one burning pin. The charging pin may be configured to supply power the sound producing device 10. The burning pin may be configured to burn data, so as to adjust parameters of the sound producing device 10, and achieve adaptation between the sound producing device 10 and different users. In some embodiments, within a same time period, the interface 610 may only use one of the charging pin or the burning pin to realize a charging function or a burning function. In some embodiments, in a same time period, the interface 610 may use the charging pin and burning pin simultaneously to realize the charging function and the burning function.

The processing chip 620 may be connected to the at least one burning pin. The processing chip 620 may burn data through the at least one burning pin. For example, the processing chip 620 may burn a program with specific parameters through the at least one burning pin. In some embodiments, the specific parameters may include parameters such as a response frequency, a sensitivity, a signal-to-noise ratio, a transient response, a distortion, etc.

The battery management module 630 may be configured to control a charging current of the battery 640. The battery 640 may be configured to power the sound producing device 10. Specifically, the battery management module 630 connected to the interface 610 through the at least one charging pin may be configured to receive an input voltage (e.g., 5V), process the input voltage, and control the charging current of the battery 640, thereby realizing charging of the battery 640. For example, the battery management module 630 may include a BQ24045 module or other types of battery management modules. The input voltage received by the battery management module 630 may be 5V.

The battery 640 may be connected to the battery management module 630 and the processing chip 620, respectively. When the battery 640 is fully charged through the battery management module 630, the battery 640 may stop charging. At the same time, the battery 640 may output a voltage to the processing chip 620 to provide a working voltage for the processing chip 620. For example, the output voltage of the battery 640 may be 1.2V.

In some embodiments, the battery 640 may include a fast-charging lithium battery. A maximum current of the fast-charging lithium battery may reach 3C (C is a total battery capacity). Compared with an ordinary rechargeable lithium battery, the maximum current may be increased by 6-15 times, thereby realizing fast charging of the battery 640.

In some embodiments, the battery management module 630 may control the charging current of the battery 640 according to the voltage of the battery 640. In some embodiments, the battery management module 630 may control the charging current of the battery 640 according to the voltage of the battery 640 by obtaining the voltage of the battery 640, and determining whether the voltage of the battery 640 is within a first preset voltage range. If the battery management module 630 detects the voltage of the battery 640 is within the first preset voltage range (e.g., 0 V-4.35 V), the charging current may be controlled to be within the first preset current range, so that the battery 640 may be fast charged. At this time, the battery 640 may be in a stage of constant current charging, and the charging current may be the first preset current (e.g., 540 mA). When the battery 640 is charged at a constant current, a voltage corresponding to the battery 640 may increase continuously. In order to prevent voltage corresponding to the battery 640 from being too large. In some embodiments, the battery management module 630 may control the charging current of the battery 640 according to the voltage of the battery 640 by determining whether the voltage of the battery 640 is within a second preset voltage range (e.g., greater than or equal to 4.35 V). If the battery management module 630 detects that the voltage of the battery 640 is within the second preset voltage range, the battery management module 630 may control to reduce the charging current. At this time, the battery 640 may be in a stage of constant voltage charging, and the charging voltage may be a certain value (e.g., 4.35 V) in the second preset voltage range. If the battery management module 630 detects that the voltage of the battery 640 is lower than the second preset voltage range, the battery management module 630 may control the charging current to be the first preset current, so that the battery 640 may continue to be in the stage of constant current charging. When the battery 640 is charged at a constant voltage, a charging current of the battery 640 may gradually decrease, that is, when the charging current decreases to a certain value, the battery 640 power may be regarded as fully charged. In some embodiments, the battery management module 630 may control the charging current of the battery 640 according to the voltage of the battery 640 by determining whether the charging current detected by the battery management module 630 is within the second preset current range (e.g., less than or equal to 27 mA). If the charging current is within the second preset current range, the battery management module 630 may control the battery 640 to stop charging. If the charging current is not within the second preset current range, the battery management module 630 may control the battery 640 to continue charging. It should be noted that the first preset voltage range, the second preset voltage range, the first preset current range, and the second preset current range may be determined according to performance of the battery 640. For example, the first preset voltage range may be OV-4.35V. The second voltage may be 4.35V. The first current may be 540 mA. The second current may be 27 mA. That is, a working voltage of the battery 640 may be 4.35V, and the cut-off current may be 27 mA.

In some embodiments, the charging assembly 60 may further include a voltage regulator, a power amplifier chip, etc. The voltage regulator and the power amplifier chip may be used as components in the charging assembly 60 or as components in the main board 50 shown in FIG. 2. The voltage regulator may be configured to convert the output voltage of the battery 640 to a regulated voltage. An input end of the voltage regulator may be connected to an output end of the battery 640. An output end of the voltage regulator may be connected to an input end of the processing chip 620. An input end of the power amplifier chip may be connected to an output end of the processing chip 620 and configured to amplify an audio signal of the processing chip 620. An output end of the power amplifier chip may be connected to a trumpet (also known as a speaker) in the core 20 (shown in FIG. 1). The trumpet may be configured to output the audio signal of the processing chip 620 amplified and processed by the power amplifier chip. In some embodiments, the sound producing device 10 may also include at least one microphone. The at least one microphone may be connected to the input end of the processing chip 620 to output at least one microphone and configured to output the received audio signal to the processing chip 620.

Figure 11:
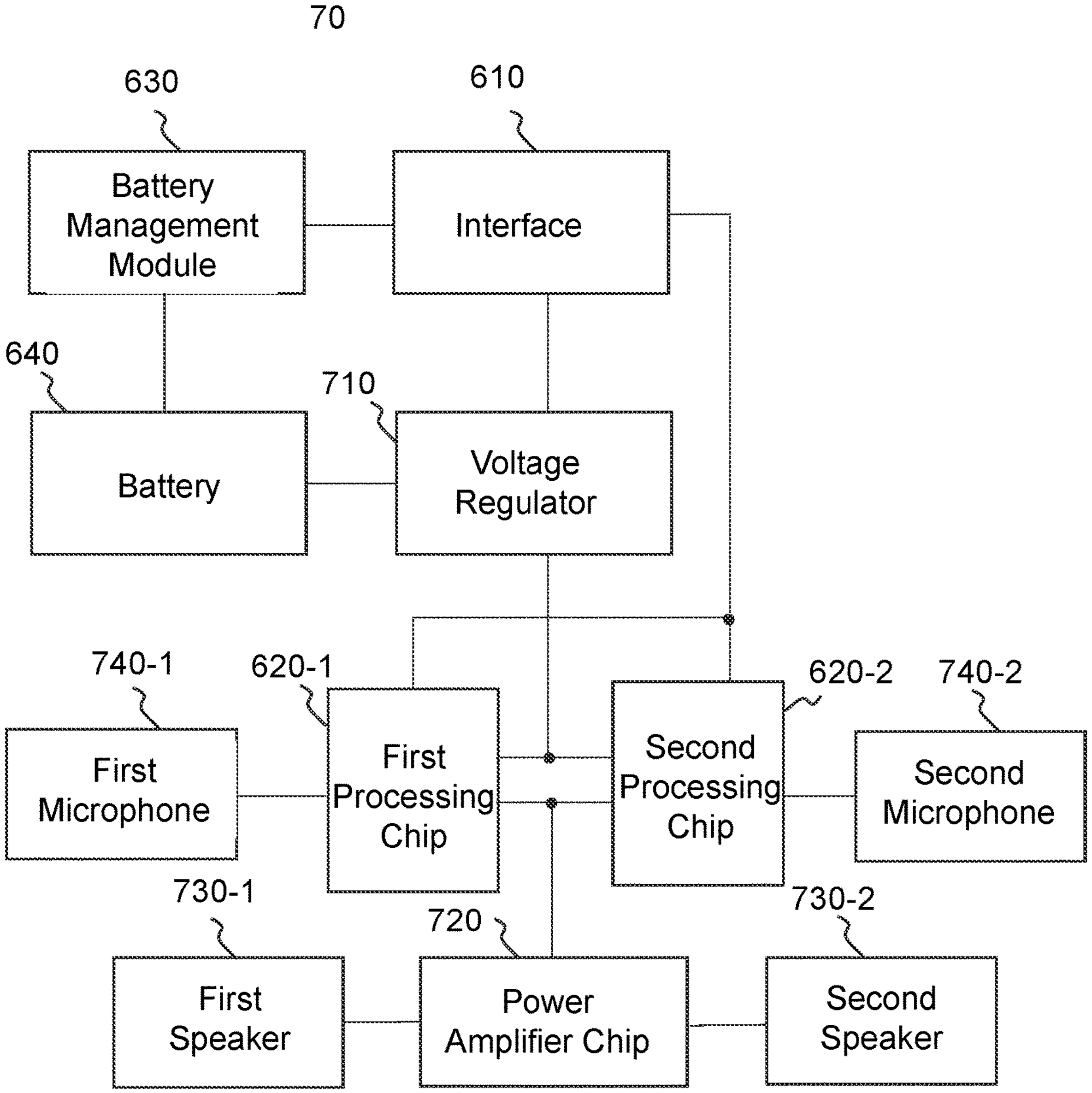
FIG. 11 is an exemplary frame diagram illustrating a sound producing device according to some embodiments of the present disclosure.

Merely by way of example, FIG. 11 is an exemplary frame diagram illustrating a sound producing device 70 according to some embodiments of the present disclosure. Based on the charging assembly 60 shown in FIG. 10, the sound producing device 70 may further include a voltage regulator 710, a power amplifier chip 720, a first speaker 730-1, a second speaker 730-2, a first microphone 740-1, and a second microphone 740-2. The processing chip 620 in the charging assembly may include a first processing chip 620-1 and a second processing chip 620-2.

An input end of the voltage regulator 710 may be connected to an output end of the battery 640. An output end of the voltage regulator 710 may be respectively connected to input ends of the first processing chip 620-1 and the second processing chip 620-2, which may be configured to convert an output voltage of the battery 640 into to a regulated voltage and output the regulated voltage to the first processing chip 620-1 and the second processing chip 620-2, so as to provide a working voltage for the first processing chip 620-1 and the second processing chip 620-2. The input end of the first processing chip 620-1 may be connected to an output end of the first microphone 740-1. The input end of the second processing chip 620-2 may be connected to an output end of the second microphone 740-2. Output ends of the first processing chip 620-1 and the second processing chip 620-2 may be respectively connected to an input terminal of the power amplifier chip 720. An output end of the power amplifier chip 720 may be respectively connected to input ends of the first speaker 730-1 and the second speaker 730-2.

In some embodiments, a working voltage of the battery 640 may be different from the working voltage the processing chip 620 (e.g., the first processing chip 620-1 and the second processing chip 620-2). The output voltage of the battery 640 may be converted into the regulated voltage by the voltage regulator 710. The regulated voltage may be the same as the working voltage of the processing chip 620. For example, the working voltage of the battery 640 may be 4.35V, that is, the output voltage of the battery 640 may be 4.35V. The working voltage of the first processing chip 620-1 and the second processing chip 620-2 may be 1.2V. The output voltage of the battery 640 may not be directly used as the working voltage of the first processing chip 620-1 and the second processing chip 620-2, and may need to be stepped down. Therefore, the voltage regulator 710 may be provided at the output end of the battery 640, which may step down the output voltage of the battery 640.

In some embodiments, the voltage regulator 710 may include a low dropout linear regulator capable of converting an accepted input voltage (e.g., 4.35V) into an appropriate output voltage (e.g., 1.2V), so that the output voltage may meet the working voltage requirement of the first processing chip 620-1 and the second processing chip 620-2. For example, the voltage regulator 710 may include a voltage regulator of a type of NCP163AMX120TBG, or other types of voltage regulators.

The first microphone 740-1 may output a received audio signal to the first processing chip 620-1. The first processing chip 620-1 may process the audio signal with a relevant algorithm, and may output a processed audio signal to the power amplifier chip 720. The power amplifier chip 720 may amplify the audio signal. The first speaker 730-1 may output an audio signal amplified and processed by the power amplifier chip 720. For example, the power amplifier chip 720 may include a MAX98306 chip or other types of power amplifier chips.

The second microphone 740-2 may output a received audio signal to the second processing chip 620-2. The second processing chip 620-2 may process the audio signal with a relevant algorithm, and may output a processed audio signal to the power amplifier chip 720. The power amplifier chip 720 may amplify the audio signal. The second speaker 730-2 may output an audio signal amplified and processed by the power amplifier chip 720. It should be noted that the above-mentioned first microphone 740-1 and the second microphone 740-2 may be respectively disposed at two cores shown in FIG. 1, or at the housing assembly 30. The first microphone 740-1 and the second microphone 740-2 may include a bone conduction microphone or an air conduction microphone. The bone conduction microphone may be configured to obtain a vibration signal of a facial muscle when a user speaks, convert the vibration signal into an audio signal, and output the audio signal to the processing chip for processing. At the same time, sound in an external environment may have little impact on the bone conduction microphone, that is to say, the bone conduction microphone may hardly pick up the sound in the external environment. By disposing a bone conduction microphone in the sound producing device, use of the sound producing device in a specific scenario (for example, a user is talking in a relatively noisy environment) may be satisfied, and speech quality of the user may be improved. The air conduction microphone may be configured to pick up sound that travels through air (e.g., sound in an external environment, sound of a user speaking, etc.).

In some embodiments, the interface 610 may include, but is not limited to a TYPE-A interface, a TYPE-B interface, a TYPE-C interface, a USB interface, a Lighting interface, or the like, or any combination thereof. In order to facilitate the detailed description of the interface 610, and the TYPE-C interface may be taken as an example. FIG. 12 is a wiring definition diagram illustrating an interface 610 according to some embodiments of the present disclosure. The interface 610 may be a TYPE-C interface, which may be compatible with a pin corresponding to a USB3.0 protocol. As shown in FIG. 12, the USB3.0 protocol may include a TX1+ pin, a TX1-pin, a RX1+ pin, a RX1-pin, a TX2+ pin, a TX2-pin, a RX2+ pin, a RX2-pin, a VBUS pin, etc. The TX1+ pin may be connected to the TX2+ pin to form a TX+ pin. The TX1-pin may be connected to the TX2-pin to form a TX-pin. The RX1+ pin may be connected to the RX2+ pin to form a RX+ pin. The RX1-pin may be connected to the RX2-pin to form a RX-pin.

Figure 13:
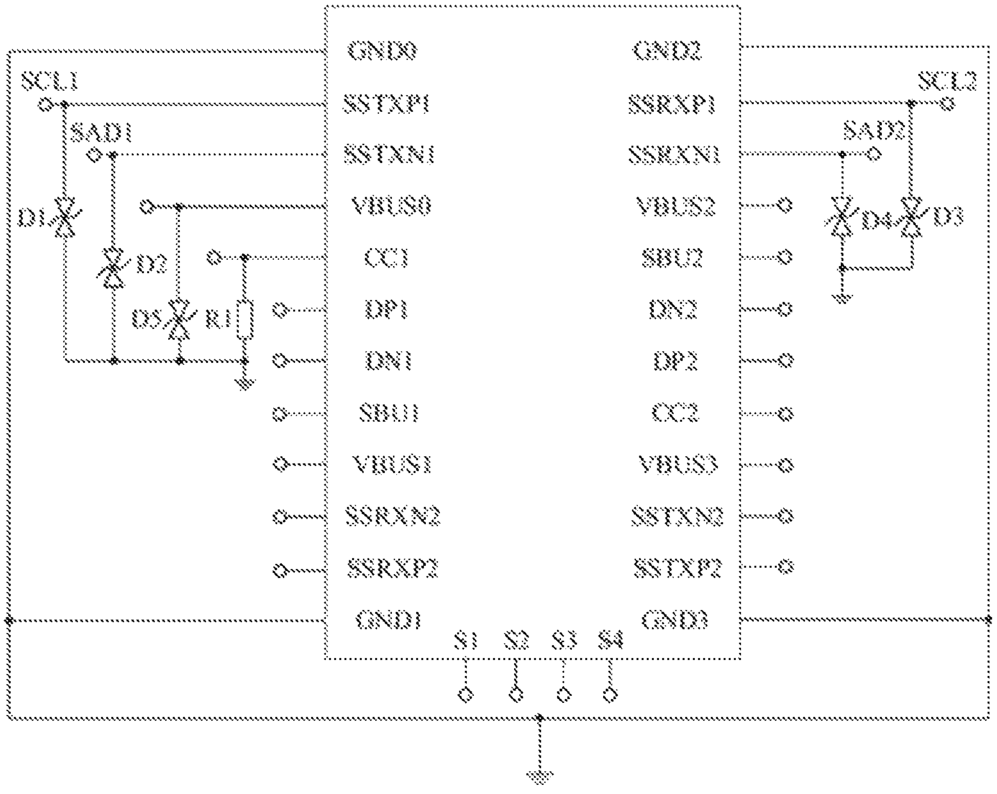
FIG. 13 is a schematic diagram illustrating a structure of an interface according to some embodiments of the present disclosure.

Merely by way of example, FIG. 13 is a schematic diagram illustrating a structure of an interface 610 according to some embodiments of the present disclosure. The TX+ pin, the TX-pin, the RX+ pin, and the RX-pin shown in FIG. 12 may respectively correspond to an SSTXP1 pin, an SSTXN1 pin, an SSRXP1 pin, and an SSRXN1 pin shown in FIG. 13. The VBUS pin may correspond to a VBUSO pin shown in FIG. 13. The interface 610 may use the TX+ pins, the TX-pin, the RX+ pin, and the RX-pin as burning pins of the TYPE-C interface, and use the VBUSO pin as a charging pin of the TYPE-C interface.

The interface 610 may be respectively connected to the first processing chip 620-1 and the second processing chip 620-2, and the burning pins of the interface 610 may be respectively connected to I2C interfaces of the first processing chip 620-1 and the second processing chip 620-2, so that the first processing chip 620-1 and the second processing chip 620-2 may burn data simultaneously. Specifically, the I2C interface of the first processing chip 620-1 may include a SCL1 pin and a SAD1 pin. The I2C interface of the second processing chip 620-2 may include a SCL2 pin and a SAD2 pin. The TX+ pin and the TX-pin may be respectively connected to the SCL1 pin and the SAD1 pin. The RX+ pin and the RX-pins may be respectively connected to the SCL2 pin and the SAD2 pin.

In some embodiments, the processing chip 620 (e.g., an E7111 chip) may have a relatively high requirement on electrostatic sensitivity and need to be treated with anti-static. For this reason, the sound producing device 10 may further include one or more components (e.g., a Transient Voltage Suppressor (TVS) Diode) for anti-static treatment. For example, as shown in FIG. 13, the sound producing device 10 may include a first TVS Diode D1, a second TVS Diode D2, a third TVS Diode D3, a fourth TVS Diode D4, and a fifth TVS Diode D5. As shown in FIG. 13, one end of the first TVS Diode D1 may be connected to the SCL1 pin. One end of the second TVS Diode D2 may be connected the SAD1 pin. One end of the third TVS Diode D3 may be connected to the SCL2 pin. One end of the fourth TVS Diode D4 may be connected to the SAD2 pin. One end of the fifth TVS Diode D5 may be connected to the VBUSO pin. The other ends of the first TVS Diode D1, the second TVS Diode D2, the third TVS Diode D3, the fourth TVS Diode D4 and the fifth TVS Diode D5 may be grounded. When a large-scale transient interference voltage or pulse current due to interference of lightning and various electrical appliances, the TVS Diode may quickly turn into a reverse conduction state in a very short time, and clamp a voltage of the circuit to a required safe value, thereby effectively protecting precision components in the electronic circuit from damage. After the interference pulse passes, the TVS Diode may turn into a reverse cut-off state again. During the reverse direction, the clamp voltage of the TVS Diode is lower than the maximum resistance of the E7111 chip, which may play a protective role in the E7111 chip.

In some embodiments, as shown in FIG. 13, the interface 610 may further include an identification pin CC1 configured to identify a functional accessory so that the sound producing device 10 may be matched and connected to the functional accessory. Optionally, the functional accessory may be an external burning device, etc.

In some embodiments, as shown in FIG. 13, the sound producing device 10 may further include a pull-down resistor R1. One end of the pull-down resistor R1 may be connected to the identification pin CC1, and the other end of the pull-down resistor R1 may be grounded. For example, a resistance value of the pull-down resistor R1 may be 5.1kΩ. In the embodiment, by disposing a pull-down resistor R1 at one end of the identification pin CC1, noise tolerance of an input signal of the sound producing device 10 may be improved, and resistance matching may be performed simultaneously to enhance an anti-interference ability.

According to some embodiments of the present disclosure, by disposing the interface 610 including at least one charging pin and at least one burning pin, the charging and burning functions of the sound producing device 10 may be realized at the same time, so that the charging operation of the sound producing device 10 is convenient and simple. The interface 610 may realize the charging function through the charging pin, and realized the burning function through the burning pin. The two functions may be realized by one interface, and no additional charging interface may be required, which may reduce the cost.

It should be understood that the schematic diagrams provided in FIGS. 1-13 are merely for illustration, which are not intended to limit the scope of the present disclosure. For those skilled in the art, various variations and modifications may be made under the guidance of the present disclosure. However, these variations and modifications may fall within the protection scope of the present disclosure. In some embodiments, one or more features of the elements shown in the figures, such as a shape, a size, a position, etc. may be adjusted according to an actual situation. In some embodiments, one or more elements shown in the figures may be omitted, or one or more other elements may be added. In some embodiments, an element may be replaced by other elements that perform a similar function. In some embodiments, an element may be split into a plurality of sub-elements, or a plurality of elements may be merged into a single element.

It should be noted that different embodiments may have different beneficial effects. In different embodiments, the possible beneficial effects may include any combination of one or more of the above, or any other possible beneficial effects that may be obtained.

Having thus described the basic concepts, it may be rather apparent to those skilled in the art after reading this detailed disclosure that the foregoing detailed disclosure is intended to be presented by way of example only and is not limiting. Although not explicitly stated here, those skilled in the art may make various modifications, improvements and amendments to the present disclosure. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms “one embodiment,” “an embodiment,” and/or “some embodiments” mean that a particular feature, structure or characteristic described in connection with the embodiment is included in at least one embodiment of the present disclosure. Therefore, it is emphasized and should be appreciated that two or more references to “an embodiment” or “one embodiment” or “an alternative embodiment” in various parts of this specification are not necessarily all referring to the same embodiment. In addition, some features, structures, or features in the present disclosure of one or more embodiments may be appropriately combined.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that the present disclosure object requires more features than the features mentioned in the claims. Rather, claimed subject matter may lie in less than all features of a single foregoing disclosed embodiment.

In some embodiments, the numbers expressing quantities or properties used to describe and claim certain embodiments of the present disclosure are to be understood as being modified in some instances by the term “about,” “approximate,” or “substantially.” For example, “about,” “approximate,” or “substantially” may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the present disclosure are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the present disclosure disclosed herein are illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A sound producing device, comprising at least one housing assembly, wherein the housing assembly includes:

a housing, wherein the housing is provided with a plug-in hole, and the plug-in hole penetrates through a side wall of a side of the housing; and a sealing member configured to plug and seal the plug-in hole, wherein the plug-in hole includes at least one hole wall segment disposed along a plugging direction of the sealing member, a cross-sectional area of at least part structure of the at least one hole wall segment on a reference section gradually increases along the plugging direction of the sealing member, the reference section is perpendicular to the plugging direction, and the sealing member is plugging fit with the at least one hole wall segment.

2. The sound producing device of claim 1, wherein the sealing member includes an insertion part configured to insert into the plug-in hole, the insertion part includes at least one protruding structure, and the at least one protruding structure abuts against the at least one hole wall segment when the insertion part is inserted into the plug-in hole.

3. The sound producing device of claim 1, wherein the at least one hole wall segment includes a first hole wall segment and a second hole wall segment, the first hole wall segment and the second hole wall segment are connected in sequence along the plugging direction of the sealing member, and an included angle between the second hole wall segment and the first hole wall segment is an obtuse angle on a reference plane parallel to the plugging direction.

4. The sound producing device of claim 3, wherein the included angle between the second hole wall segment and the first hole wall segment on the reference plane is $\theta$, and $155° \leq \theta < 180°$.

5. The sound producing device of claim 3, wherein a cross-sectional area of the second hole wall segment on the reference section gradually increases along the plugging direction.

6. The sound producing device of claim 2, wherein the housing further includes a mounting hole, the sealing member includes an assembly part connected to the insertion part, and the assembly part is fixedly connected to the housing through the mounting hole.

7. The sound producing device of claim 6, wherein a free end of the insertion part is provided with an avoidance structure, the avoidance structure is configured to reduce interference between a corner of the free end of the insertion part away from the assembly part and the housing during a process of inserting the insertion part into the plug-in hole or taking out the insertion part from the plug-in hole.

8. The sound producing device of claim 6, wherein the housing includes an accommodating cavity, the plug-in hole and the mounting hole are respectively connected with the accommodating cavity, the housing assembly further includes an interface disposed in the accommodating cavity, the interface is disposed correspondingly to the plug-in hole, and the interface is exposed through the plug-in hole after the insertion part is taken out of the plug-in hole.

9. The sound producing device of claim 1, further comprising a charging assembly fixed in the accommodating cavity of the housing, wherein the charging assembly includes:

an interface including at least one charging pin and at least one burning pin;

a processing chip connected to the at least one burning pin, wherein the processing chip burns data through the at least one burning pin to adjust parameters of the sound producing device; and a battery management module and a battery, wherein the battery management module is configured to control a charging current of the battery, the battery is configured to power the sound producing device, and the battery management module is connected to the at least one charging pin.

10. The sound producing device of claim 9, wherein the interface includes at least one of: a TYPE-A interface, a TYPE-B interface, a TYPE-C interface, a USB interface, or a Lighting interface.

11. The sound producing device of claim 10, wherein the interface is the TYPE-C interface, and a TX+pin, a TX−pin, a RX+pin and a RX−pin of the TYPE-C interface are the at least one burning pin used to burn the data.

12. The sound producing device of claim 9, wherein the battery is a fast-charging lithium battery, and the battery management module controls the charging current according to a voltage of the battery.

13. The sound producing device of claim 12, wherein the battery management module controls the charging current according to the voltage of the battery by:

obtaining the voltage of the battery;

determining whether the voltage of the battery is within a first preset voltage range; and in response to determining that the voltage of the battery is within the first preset voltage range, controlling the charging current to be within a first preset current range.

14. The sound producing device of claim 12, wherein the battery management module controls the charging current according to the voltage of the battery by:

obtaining the voltage of the battery;

determining whether the voltage of the battery is within a second preset voltage range; and in response to determining that the voltage of the battery is within the second preset voltage range, reducing the charging current to keep the voltage of the battery being within the second preset voltage range.

15. The sound producing device of claim 12, wherein the battery management module controls the charging current according to the voltage of the battery by:

obtaining the charging current;

determining whether the charging current is within a second preset current range; and in response to determining that the charging current is within the second preset current range, controlling the battery to stop charging.

16. The sound producing device of claim 9, wherein the charging assembly further includes a voltage regulator configured to convert an output voltage of the battery into a regulated voltage; and an input end of the voltage regulator is connected to an output end of the battery, and an output end of the voltage regulator is connected to an input end of the processing chip.

17. The sound producing device of claim 9, wherein the sound producing device further includes:

a power amplifier chip, wherein an input end of the power amplifier chip is connected to an output end of the processing chip, and the power amplifier chip is configured to amplify an audio signal of the processing chip; and at least one speaker connected to an output end of the power amplifier chip and configured to output the audio signal of the processing chip amplified and processed by the power amplifier chip.

18. The sound producing device of claim 9, wherein the sound producing device further includes:

at least one microphone connected to an input end of the processing chip and configured to output a received audio signal to the processing chip.

19. The sound producing device of claim 9, wherein the interface includes an identification pin configured to identify a functional accessory so that the sound producing device is matched and connected to the functional accessory.

20. The sound producing device of claim 9, wherein the charging assembly includes a plurality of TVS Diodes, one end of the TVS Diode is connected to the burning pin or the charging pin, and the other end of the TVS Diode is grounded.

* * * * *